(12) United States Patent
Hong et al.

(10) Patent No.: US 11,498,477 B2
(45) Date of Patent: Nov. 15, 2022

(54) ROTATION CENTER DECOUPLING TYPE AIMING LAMP AND VEHICLE INCLUDING THE AIMING LAMP

(71) Applicants: Hyundai Motor Company, Seoul (KR); Kia Corporation, Seoul (KR); SL Corporation, Daegu (KR)

(72) Inventors: Seung-Pyo Hong, Incheon (KR); Hyeon-Cheol Kim, Gyeongsangbuk-do (KR); Jong-Du Ro, Daegu (KR); Dong-Hun Choi, Gyeongsangbuk-do (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/518,413

(22) Filed: Nov. 3, 2021

(65) Prior Publication Data

US 2022/0314868 A1 Oct. 6, 2022

(30) Foreign Application Priority Data

Apr. 2, 2021 (KR) .................. 10-2021-0043250

(51) Int. Cl.
*B60Q 1/068* (2006.01)
*B60Q 1/20* (2006.01)
(Continued)

(52) U.S. Cl.
CPC .............. *B60Q 1/068* (2013.01); *B60Q 1/20* (2013.01); *F21S 41/20* (2018.01); *F21S 41/32* (2018.01);
(Continued)

(58) Field of Classification Search
CPC . F21V 21/26; F21V 7/16; F21V 21/30; F21V 7/18; B60Q 1/068; B60Q 1/0683; F21S 41/67; F21S 41/675
See application file for complete search history.

(56) References Cited

U.S. PATENT DOCUMENTS

| 5,993,032 A * | 11/1999 | Herbers ................. B60Q 1/076 362/528 |
| 2002/0114660 A1* | 8/2002 | Burton ................ F16C 11/0604 403/122 |

(Continued)

FOREIGN PATENT DOCUMENTS

| CN | 101372248 B * | 3/2012 | .......... B60Q 1/0683 |
| KR | 2007-0045588 A | 5/2007 | |

*Primary Examiner* — Colin J Cattanach
(74) *Attorney, Agent, or Firm* — Fox Rothschild LLP

(57) ABSTRACT

A rotation center decoupling type aiming lamp applied to a vehicle includes an aiming device in which an aiming axis spaced apart from an aiming point reference line of an aiming point axis at a distance of an aiming adjustment height is operated as a rotation center of the reflector, and an aiming angle is changed through an aiming point axis to which the reflector is attached by a reflector bracket, such that the rotation center of the reflector adjusting a light radiation direction may be formed at a position above or ahead of the aiming point reference line, thereby reducing an occupation space of the aiming device and securing stability of the aiming driving, and particularly, a sufficient rear shock absorption space may also be secured in the aiming lamp, thereby securing structural robustness while satisfying low-speed collision regulations.

20 Claims, 9 Drawing Sheets

(51) Int. Cl.
    *F21S 41/32*      (2018.01)
    *F21S 41/20*      (2018.01)
    *F21S 43/50*      (2018.01)
    *F21W 102/00*     (2018.01)
    *F21V 21/26*      (2006.01)
    *F21S 41/67*      (2018.01)
    *F21V 21/30*      (2006.01)
    *F21S 41/675*     (2018.01)
    *F21V 14/04*      (2006.01)

(52) U.S. Cl.
    CPC ............ *F21S 43/51* (2018.01); *B60Q 1/0683* (2013.01); *F21S 41/67* (2018.01); *F21S 41/675* (2018.01); *F21V 14/04* (2013.01); *F21V 21/26* (2013.01); *F21V 21/30* (2013.01); *F21W 2102/00* (2018.01)

(56) References Cited

U.S. PATENT DOCUMENTS

| | | | | |
|---|---|---|---|---|
| 2003/0090773 A1* | 5/2003 | Tanno | ................. | F21V 7/28 |
| | | | | 359/223.1 |
| 2005/0002200 A1* | 1/2005 | Leathley | ............. | B60Q 1/0683 |
| | | | | 362/284 |
| 2006/0092653 A1* | 5/2006 | Tachiiwa | ............ | B60Q 1/0683 |
| | | | | 362/512 |
| 2013/0215634 A1* | 8/2013 | Tseng | .................... | F21S 41/321 |
| | | | | 362/516 |

\* cited by examiner

B ENLARGED DIAGRAM

FIG.9
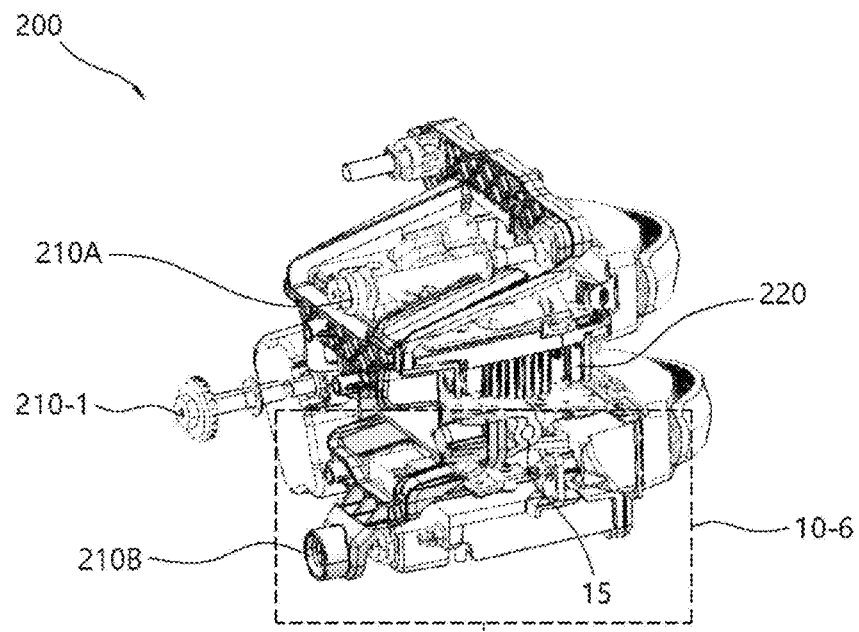
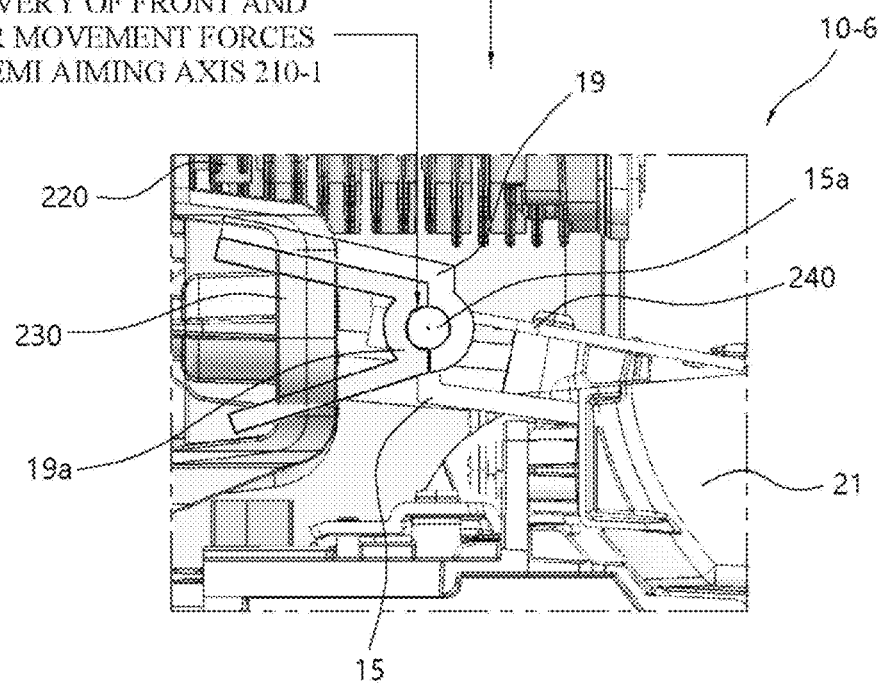
DELIVERY OF FRONT AND
REAR MOVEMENT FORCES
OF SEMI AIMING AXIS 210-1

ROTATION CENTER DECOUPLING TYPE AIMING LAMP AND VEHICLE INCLUDING THE AIMING LAMP

CROSS-REFERENCE TO RELATED APPLICATION

This application claims under 35 U.S.C. § 119(a) the benefit of Korean Patent Application No. 10-2021-0043250, filed on Apr. 2, 2021, the entire contents of which are incorporated herein by reference.

BACKGROUND

(a) Technical Field

The present disclosure relates to an aiming lamp, more particularly, to a vehicle using a rotation center decoupling type aiming lamp, in which an aiming axis for an aiming point axis is moved to an upward or forward position to adjust a light radiation direction.

(b) Description of Related Art

Generally, an aiming device applied to a lamp for a vehicle adjusts a light radiation direction such that a lighting pattern of the lamp is matched with an initial setting state.

A fog lamp is an example of the lamp to which the aiming device may be applied. This is because the fog lamp is mounted below a head lamp at a front/rear of the vehicle and used when there is fog or the weather is bad, such that it is necessary to accurately be matched with the initial setting state by the aiming device.

For example, the aiming device for the fog lamp typically includes a reflector integrated aiming device configured to apply an aiming axis center to an aiming reference point, and to adjust a radiation direction of light through aiming by movement of a reflector connected to the aiming axis by front and rear (or left and right) directional rotations of the aiming axis.

The aiming device may be provided on various lamps for the vehicle other than the fog lamp for adjusting a position of a light source (e.g., bulb or LED) to adjust a direction in which the light of the lamp is radiated to a desired position.

However, the reflector integrated aiming device structurally positions the aiming axis for performing aiming of the reflector on a rear end of the reflector, such that an amount of movement in the front generated upon adjusting the aiming increases, thereby making gap management disadvantageous.

Further, in the reflector integrated aiming device, an additional structure, such as a pivot or a retainer, should be connected to the aiming axis for the front and rear (or left and right) directional rotations of the aiming axis, and a rear space having a large length (about 57 mm) behind the lamp due to the additional structure is needed, thereby increasing the size of the lamp.

In addition, due to the rear space of the reflector integrated aiming device, collision performance of the vehicle may deteriorate as a result of the large length (about 57 mm) of the rear space.

The contents described in Description of Related Art are to help the understanding of the background of the present disclosure, and may include what is not previously known to those skilled in the art to which the present disclosure pertains.

SUMMARY

Therefore, an object of the present disclosure is to provide a rotation center decoupling type aiming lamp and a vehicle thereof, which form a rotation center of a reflector for adjusting a light radiation direction on a position above or ahead of an aiming point reference line, thereby reducing an occupation space of the aiming device in an internal space of the aiming lamp, and remove occurrence of a gap by a minute movement of the reflector due to an increase in a vertical inter-axis distance, thereby securing stability of the aiming driving, and particularly, form a rear shock absorption space in the aiming lamp by an amount of reduction in size of the aiming device, thereby securing structural robustness of the aiming lamp while satisfying low-speed collision regulations.

An aiming lamp according to the present disclosure for achieving the object includes an aiming point axis forming an aiming point reference line in an internal space of the aiming lamp, and configured to be moved in front and rear directions for adjusting aiming of a light source, an aiming axis positioned in an upper portion of the internal space of the aiming lamp, and forming an aiming adjustment height with respect to the aiming point reference line, and a reflector bracket connected to a reflector for reflecting the light of the light source, for delivering movement of the aiming point axis, and constituted such that an aiming angle of the light source is changed by an angular motion of the reflector using the aiming axis as a rotation center.

As a preferred exemplary embodiment, the aiming axis forms the rotation center of the reflector with a pivot end having a circular section.

As the preferred exemplary embodiment, the aiming axis is connected to the reflector by a rotation interval body forming the pivot end.

As the preferred exemplary embodiment, the rotation interval body is formed with at least one bending portion, and the bending portion adjusts a change in angular motion of the reflector by adjusting a distance of the aiming adjustment height.

As the preferred exemplary embodiment, the pivot end is formed with a pivot rotation part, and the pivot rotation part is formed by combining one or more of a lens positioned ahead of the reflector, a lamp housing forming an internal space in which the reflector is accommodated, or a bezel positioned between the lenses.

As the preferred exemplary embodiment, two or more of the lens, the lamp housing, or the bezel are formed with hemispheric section grooves surrounding a circular section portion of the pivot end on both sides thereof, the hemispheric section groove forms an aiming movement gap with respect to the circular section portion of the pivot end, and the aiming movement gap provides movement to the aiming axis to secure a space in which the reflector is aimed.

As the preferred exemplary embodiment, two or more of the lens, the lamp housing, or the bezel are formed with hemispheric section grooves surrounding a circular section portion of the pivot end on both sides thereof, and each of the lens and the bezel is formed with a housing connection part coupled to the lamp housing.

As the preferred exemplary embodiment, the aiming axis forms the rotation center of the reflector with a curved end, the curved end forms a virtual focus for the reflector, the curved end is constituted by combining one or more of a lens positioned ahead of the reflector, a lamp housing forming an internal space in which the reflector is accommodated, or a bezel positioned between the lenses.

As the preferred exemplary embodiment, two or more of the lens, the lamp housing, or the bezel are formed with curved surfaces instead of closely contacting the curved end on both sides thereof.

As the preferred exemplary embodiment, the aiming axis is coupled to an aiming axis bracket, the aiming axis bracket is fixed to a lamp housing forming an internal space in which the reflector is accommodated, the aiming axis bracket protrudes toward the reflector to surround a pivot end of the aiming axis, and the aiming axis bracket is fastened to the lamp housing by a screw.

Further, a vehicle according to the present disclosure for achieving the object is characterized by including an aiming lamp in which a rotation center of an aiming axis spaced apart from an aiming point reference line of an aiming point axis at an aiming adjustment height forms a moment distance of a reflector, and an aiming angle of a light source is changed by forming an angular motion of the reflector at the moment distance.

As a preferred exemplary embodiment, the aiming lamp changes the aiming angle by the aiming device, and the aiming device forms a pivot rotation part by surrounding a pivot end of the aiming axis by combining one or more of a lens positioned ahead of the reflector, a lamp housing forming an internal space in which the reflector is accommodated, or a bezel positioned between the lenses.

As the preferred exemplary embodiment, the aiming lamp is a fog lamp, and the fog lamp is applied with a lens type aiming device forming the pivot rotation part by the lens and the lamp housing or a bezel type aiming device forming the pivot rotation part by the bezel and the lamp housing.

As the preferred exemplary embodiment, the aiming lamp is a fog lamp, and the fog lamp is applied with a forward movement type aiming device in which the pivot rotation part is formed by the lens and the lamp housing or the bezel and the lamp housing, and each of the lens and the bezel is formed with a housing connection part coupled to the lamp housing.

As the preferred exemplary embodiment, the aiming lamp is a fog lamp, and the fog lamp is applied with a virtual focus type aiming device in which the pivot rotation part is formed by the lens and the lamp housing or the bezel and the lamp housing, and a virtual focus for the reflector is formed.

As the preferred exemplary embodiment, the aiming lamp is a fog lamp, and the fog lamp is applied with a housing type aiming device in which the pivot rotation part is formed by an aiming axis bracket coupled to the aiming axis and fixed to the lamp housing.

As the preferred exemplary embodiment, the aiming lamp is a headlamp, and the headlamp is applied with a semi type aiming device in which a semi aiming axis connected to a high beam aiming device is provided, and the semi aiming axis is connected to the aiming axis by a pivot bracket.

The rotation center decoupling type aiming lamp applied to the vehicle according to the present disclosure implements the following operations and effects.

First, by moving the position of the aiming axis for the aiming point axis upward or forward using the reflector or the lamp housing, it is possible to move the reflector for adjusting the light radiation direction even without the conventional pivot and retainer, and particularly, by moving the reflector with the stress distribution effect through the surface contact even while simplifying the assembly by seating the injected product, it is possible to achieve the vibration safety of the reflector.

Second, by removing the conventional pivot and retainer from the aiming lamp, it is possible to reduce the cost and weight of the aiming lamp, and by forming the rear shock absorption space in the aiming lamp by an amount of reduction in the size of the aiming device, thereby securing the structural robustness of the aiming lamp meeting the low-speed collision regulation.

Third, the aiming axis may reduce an amount of angle changed of the reflector at the inter-axis distance away from the aiming point axis of the lower side at the position above/ahead of the reflector, thereby stably driving the aiming even while precisely adjusting the aiming.

Fourth, the movement of the reflector by the aiming axis may generate a fewer amount of angle changed around the lens or the bezel matched closely, thereby improving the appearance defect problem caused by the occurrence of the gap after aiming, and particularly, form the virtual axis to move the aiming axis forward, thereby reducing an amount of changes in the appearance before/after aiming for the aiming lamp.

Fifth, by assembling the aiming axis in the lamp housing using the separate structure to form the inter-axis distance away from the aiming point axis of the lower side, it is possible to apply the structure which is easily not separated while freely moving the aiming axis vertically, and particularly, to perform the adjustment to the same aiming angle regardless of the interval between the aiming axis and the aiming point axis by the separate structure.

BRIEF DESCRIPTION OF THE DRAWINGS

FIG. 9 is a diagram illustrating a configuration of the rotation center decoupling type aiming lamp according to the present disclosure applied to a semi type aiming device as the head lamp.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to accompanying exemplary drawings, and the exemplary embodiment is illustrative and may be implemented by those skilled in the art to which the present disclosure pertains in various different forms, and thus is not limited to the exemplary embodiment described herein.

Figure 1:
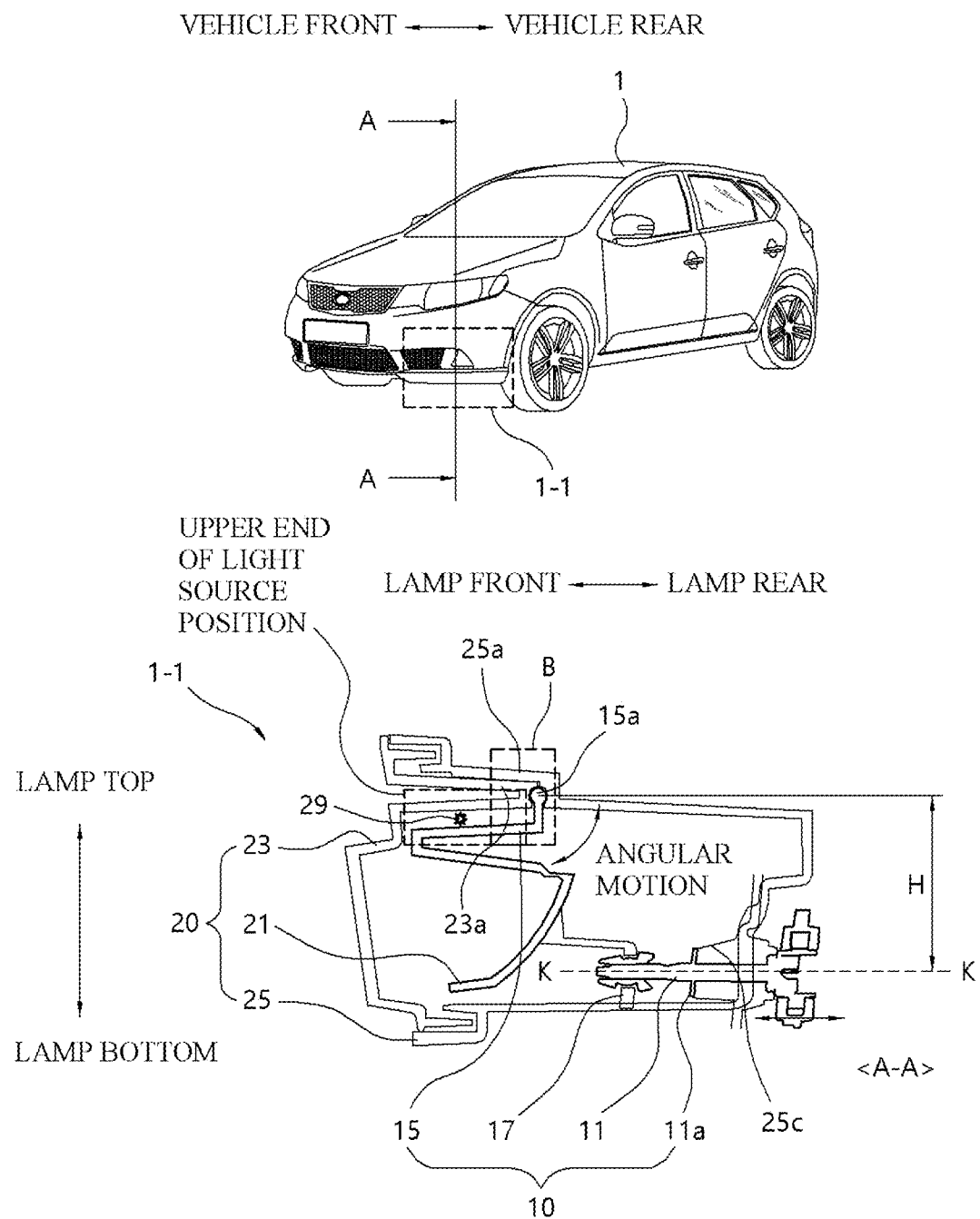
FIG. 1 is a diagram illustrating a configuration of a rotation center decoupling type aiming lamp applied as a head lamp for a vehicle according to the present disclosure uses an aiming device combined with a lens.
Figure 2:
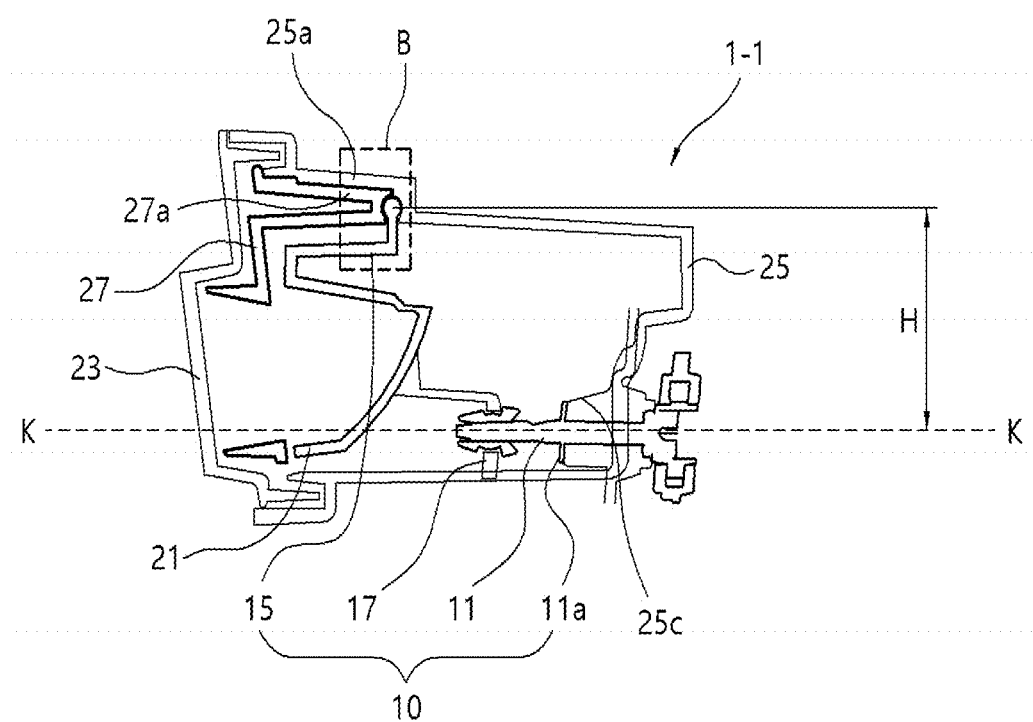
FIG. 2 is a diagram illustrating a configuration of the rotation center decoupling type aiming lamp according to the present disclosure uses an aiming device combined with a bezel.
Figure 3:
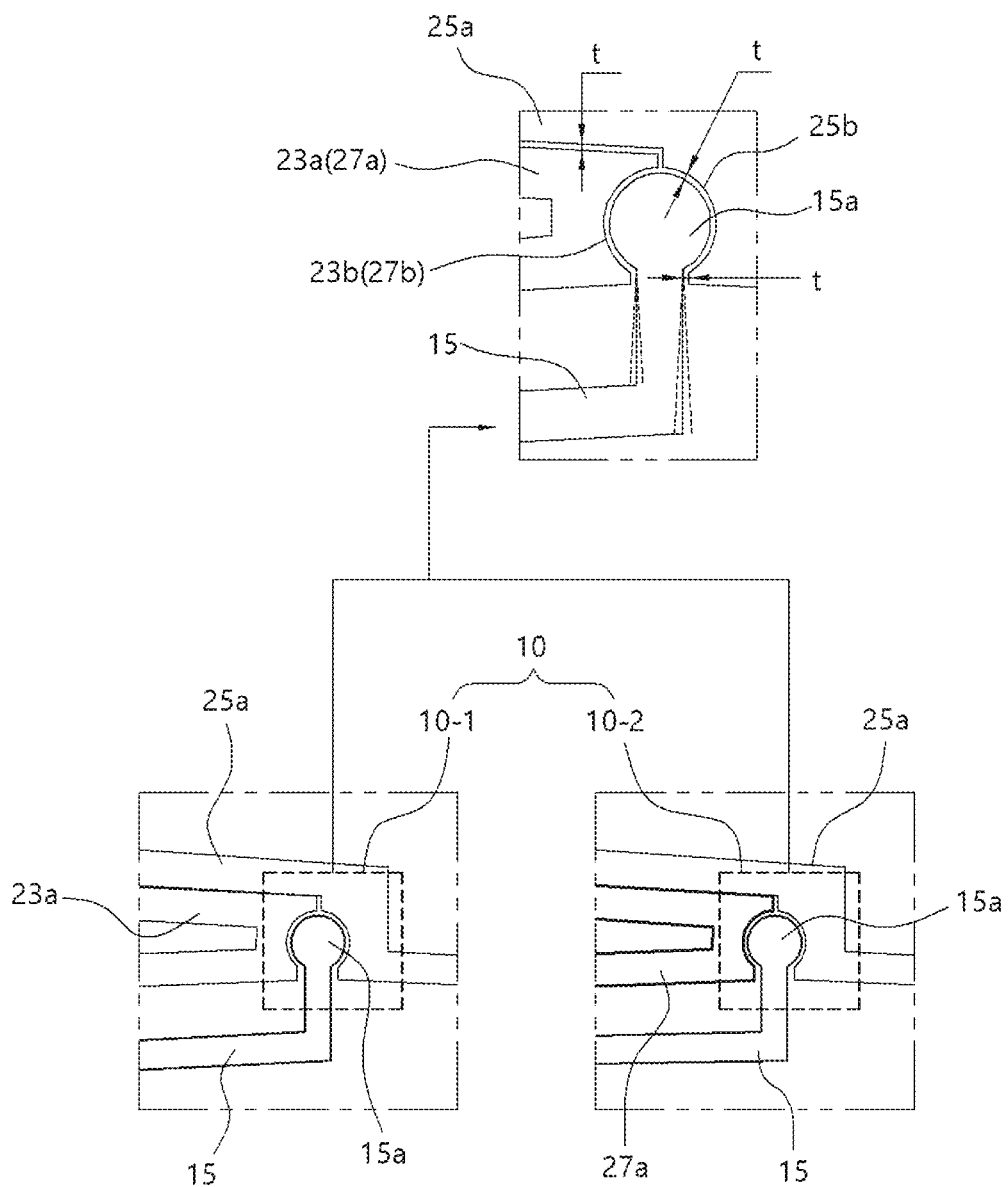
FIG. 3 is a diagram illustrating a specific configuration of a pivot structure of an aiming axis applied to lens combination type and bezel combination type aiming devices according to the present disclosure.

FIGS. 1 to 3 illustrate a basic configuration of an aiming lamp 1-1.

Referring to FIG. 1, a vehicle 1 is provided with the aiming lamp 1-1 forming a lighting pattern outside a vehicle, and the aiming lamp 1-1 is composed of an aiming device 10 positioned in an internal space of a light source module 20.

Particularly, in the aiming device 10, an aiming axis 15 is spaced apart from an aiming point reference line (K-K) of the aiming point axis 11 positioned in the lower side of the internal space of the light source module 20 at an aiming adjustment height (H) to be positioned in an upper side of the light source module 20, and the aiming adjustment height (H) further increases a moment distance of a reflector 21 with respect to a pivot end 15a of the aiming axis 15, thereby reducing an amount of angle changed of the reflector 21 by an amount of moment distance increased upon adjusting aiming using the aiming point axis 11 on a lower side of the pivot end 15a.

Therefore, the aiming lamp 1-1 may be a rotation center decoupling type aiming lamp. The feature of the rotation center decoupling type aiming lamp may overcome problems in the related art including difficulty in gap management of the reflector due to an increase in an amount of front movement occurring in the conventional aiming axis structure (i.e., integrated structure of the aiming point axis 11 and the aiming axis 15) in which the aiming axis is positioned on a rear end of the reflector, and deterioration of collision performance due to a longitudinal rear space of the internal space of the lamp mounted with an additional structure, such as a pivot or a retainer connected to the aiming axis.

As provided herein, the aiming device 10 includes the aiming point axis 11, the aiming axis 15, and a reflector bracket 17. Further, the light source module 20 includes the reflector 21, a lens 23, a lamp housing 25, and a light source 29.

For example, the aiming point axis 11 is composed of a screw body coupled to a housing support 25c of the lamp housing 25 by a screw to perform a front and rear directional movement by rotation, and formed as an aiming point reference line for adjusting the aiming. In this case, the aiming point axis 11 is formed with a stopper 11a in a predetermined section of the screw body to contact the housing support 25c of the lamp housing 25, thereby limiting the position in which the aiming point axis 11 is released backward.

Particularly, the aiming point axis 11 may be positioned behind the reflector 21 or set on a side surface position (see FIG. 7) of the reflector 21. Therefore, the position of the aiming point axis 11 may have the advantage capable of being selectively designed according to a package layout of the aiming lamp 1-1.

For example, the aiming axis 15 is connected to the reflector 21 by a rotation interval body, and is formed with the pivot end 15a on an edge of the rotation interval body, and thus is positioned upward from the cross section of the lamp with respect to the aiming point reference line (K-K) of the aiming point axis 11 to form the aiming adjustment height (H). In this case, the pivot end 15a is a vertical portion connected to the rotation interval body of the aiming axis 15 so as to easily form a pivot end shape, and the vertical portion is vertically formed on the edge of a bending portion of the rotation interval body.

Particularly, the rotation interval body is formed with at least one bending portion, and may provide the advantage capable of variably adjusting the moment distance of the reflector 21 with respect to the pivot end 15a of the aiming axis 15 at the aiming adjustment height (H) by the bending portion. Further, the pivot end 15a may be formed of aspheric ball or formed of a cylinder with a circular section.

For example, the reflector bracket 17 is fixed to the screw body of the aiming point axis 11 to move together upon the front and rear direction movement of the aiming point axis 11 to push or pull the reflector 21, and positioned upward from the aiming point reference line (K-K) at a predetermined height, thereby making the aiming adjustment height (H).

For example, the reflector 21 condenses and fully reflects the light of the light source 29 to send the light to the lens 23. The lens 23 is exposed to the outside from a front surface of the lamp to send the light of the light source 29 to the outside to be formed as a lighting pattern. The lamp housing 25 is fastened to the screw body of the aiming point axis 11 by the screw using the housing support 25c making the appearance of the lamp and protruding to the internal space of the lamp. The light source 29 is turned on by a lamp turn-on signal to generate light, and applies a bulb or a light emitting diode (LED). In this case, the light source 29 is provided at a position at which the light may be reflected by the reflector 21, and for example, may be provided in the internal space of the lamp of the aiming lamp 1-1 using an upper portion of the reflector 21 as an upper end of the light source position.

Therefore, the reflector 21, the lens 23, the lamp housing 25, and the light source 29 are components of a typical light source module, and the components may be coupled and assembled according to a known method.

However, the light source module 20 has a structural difference in that a lens support part 23a is formed on the lens 23 and a housing support part 25a is formed on the lamp housing 25, and the structural difference allows the aiming device 10 to be constituted as a lens type aiming device 10-1.

In particular, the lens type aiming device 10-1 is formed with the pivot end 15a of the aiming axis 15 as a rotation center point using the lens support part 23a of the lens 23 and the housing support part 25a of the lamp housing 25.

Referring to FIG. 2, the light source module 20 may be constituted to include a bezel 27 together with the reflector 21, the lens 23, the lamp housing 25, and the light source 29. For example, the bezel 27 is positioned between the reflector 21 and the lens 23 to play a lens role of the lens 23 instead of the lens 23.

Therefore, the reflector 21, the lamp housing 25, and the light source 29 have the structures and functions illustrated in FIG. 1.

However, the bezel 27 is formed with a bezel support part 27a, and the bezel support part 27a is connected to the housing support part 25a of the lamp housing 25, such that there is a difference in that the lens 23 is not formed with the lens support part 23a unlike in FIG. 1.

Particularly, the structural difference between the bezel 27 and the lens 23 allows the aiming device 10 to be constituted as a bezel type aiming device 10-2.

For example, the bezel type aiming device 10-2 is formed with the pivot end 15a of the aiming axis 15 as the rotation center point using the bezel support part 27a of the bezel 27 and the housing support part 25a of the lamp housing 25.

FIG. 3 illustrates a pivot rotation part (or pivot rotation structure) formed by the pivot end 15a of the aiming axis 15 applied to the lens type aiming device 10-1 and the bezel type aiming device 10-2.

As shown in FIG. 3, the pivot rotation part (or pivot rotation structure) is composed of the pivot end 15a having a circular section on the aiming axis 15, hemispheric section grooves 23b, 27b dug into the edge of the lens support part 23a of the lens 23 or the bezel support part 27a of the bezel 27, and a hemispheric section groove 25b dug into the edge of the housing support part 25a of the lamp housing 25.

Therefore, with respect to the pivot end 15a, the pivot rotation part (or pivot rotation structure) has one side portion surrounded by the hemispheric section groove 23b of the lens 23 or the hemispheric section groove 27b of the bezel 27 and the opposite side portion surrounded by the hemispheric section groove 25b of the lamp housing 25, such that the vertical portion of the pivot end 15a comes out from the hemispheric section groove 27b and is connected to the rotation interval body of the aiming axis 15.

Particularly, in the pivot rotation part (or pivot rotation structure), the hemispheric section groove 23b of the lens support part 23a or the hemispheric section groove 27b of the bezel support part 27a and the hemispheric section groove 25b of the housing support part 25a forms an aiming movement gap (t) with respect to the pivot end 15a, and form the aiming movement gap (t) between the lens support part 23a and the housing support part 25a or the housing support part 25a and the bezel support part 27a.

As described above, the aiming axis 15 forms the aiming movement gap (t) in the pivot end 15a to provide the movement to the rotation interval body of the aiming axis 15 by the gap upon adjusting the aiming, and a space in which the reflector 21 is aimed may be secured by the front and rear or left and right movement by the gap.

Figure 4:
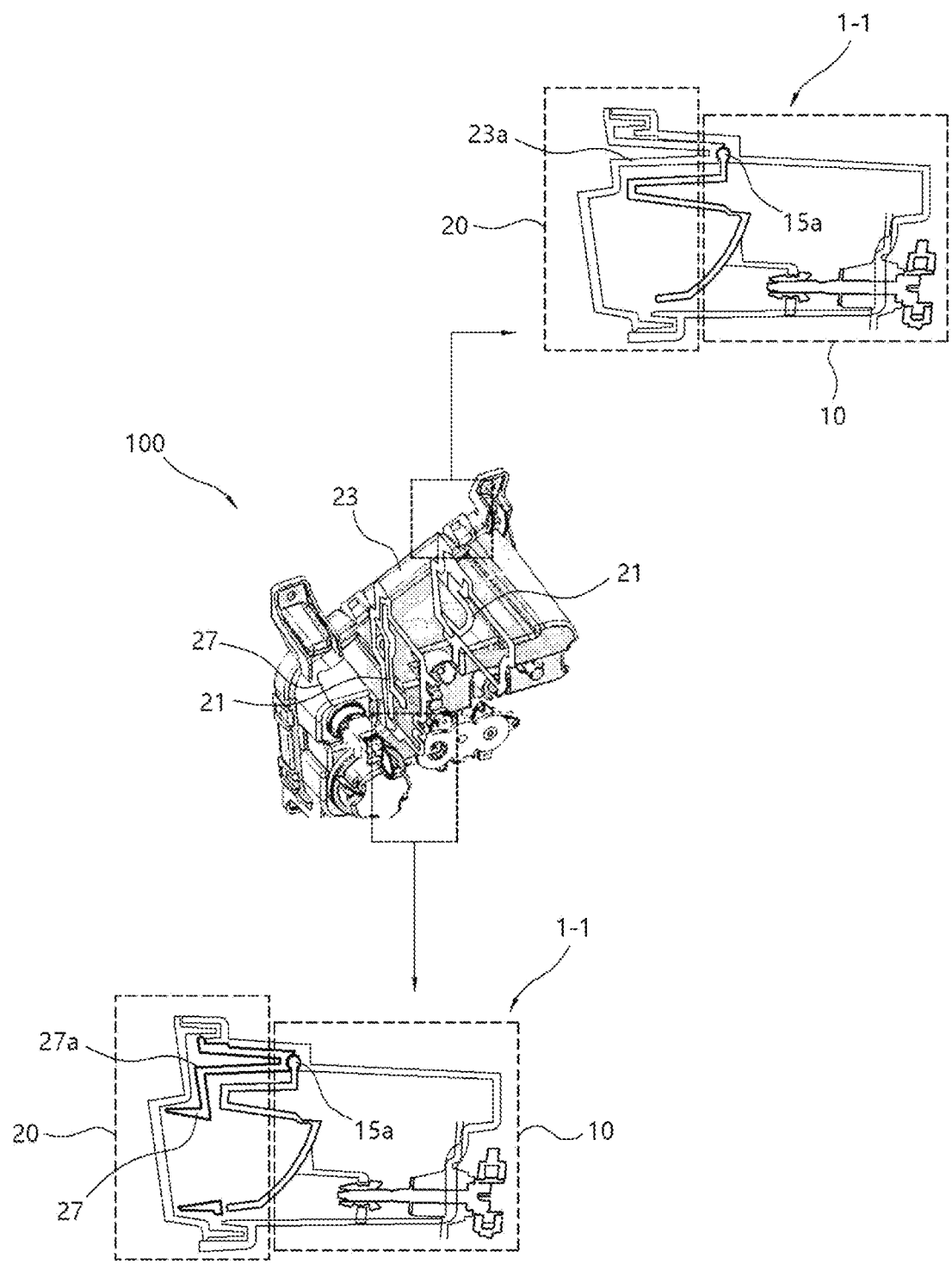
FIG. 4 is a diagram illustrating an example in which the aiming lamp applying the lens combination type aiming device and the bezel combination type aiming devices according to the present disclosure as the rotation center decoupling structure is composed of a 2 pivot type fog lamp.

Meanwhile, FIG. 4 illustrates an example in which the aiming lamp 1-1 illustrated in FIG. 1 is constituted as a 2 pivot type fog lamp 100.

As illustrated, the fog lamp 100 applies the lens type aiming device 10-1 (see FIG. 1) or the bezel type aiming device 10-2 (see FIG. 2) to the internal space of the light source module 20.

Therefore, the fog lamp 100 may use the aiming adjustment heights (H) of the lens type aiming device 10-1 and the bezel type aiming device 10-2 as the moment distance of the reflector 21 to adjust the aiming by the advantage of the aiming center axis upward structure capable of reducing an amount of angle changed upon the angular motion of the reflector 21.

Therefore, the fog lamp 100 may secure a stable state of the aiming driving in a state where the aiming point in the lower side and the moment distance of the reflector 21 between the inter axis distances is away from each other through the aiming adjustment height (H) upon adjusting the aiming of the reflector 21 with respect to the aiming point reference line (K-K) by rotating the aiming point axis 11.

In a practical aiming structure test, it was proved that if the aiming was adjusted by moving the aiming point axis 11 forward by about 3 mm, an amount of aiming angle changed was small as the aiming axis was high, thereby adjusting the aiming more precisely.

Meanwhile, FIGS. 5 to 8 illustrate that the aiming device 10 is composed of a virtual focus type aiming device 10-3, a forward movement type aiming device 10-4, and a housing type aiming device 10-5.

Figure 5:
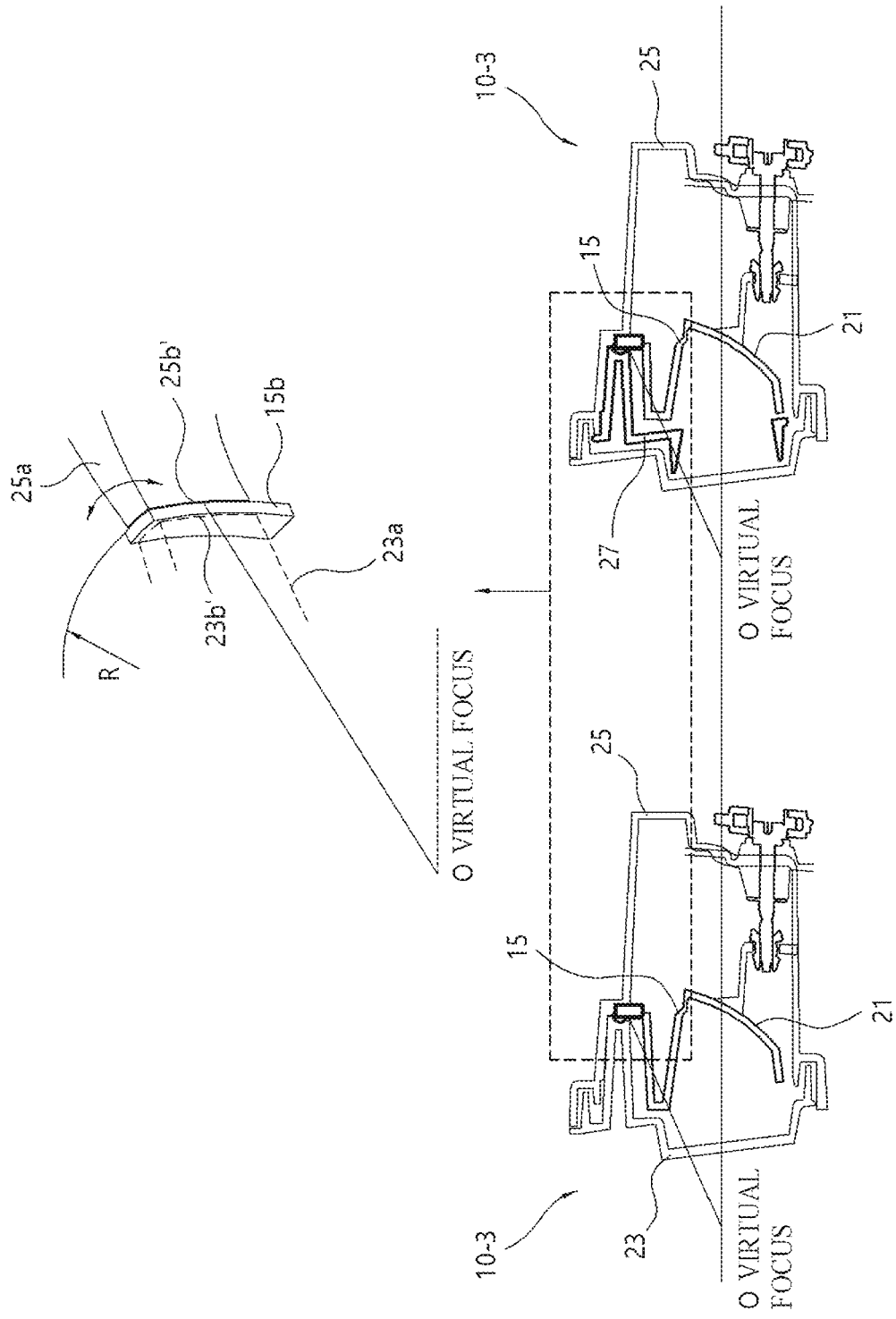
FIGS. 5 and 6 are diagrams illustrating a configuration of the rotation center decoupling type aiming lamp according to the present disclosure applying a forward movement type aiming device.
Figure 6:
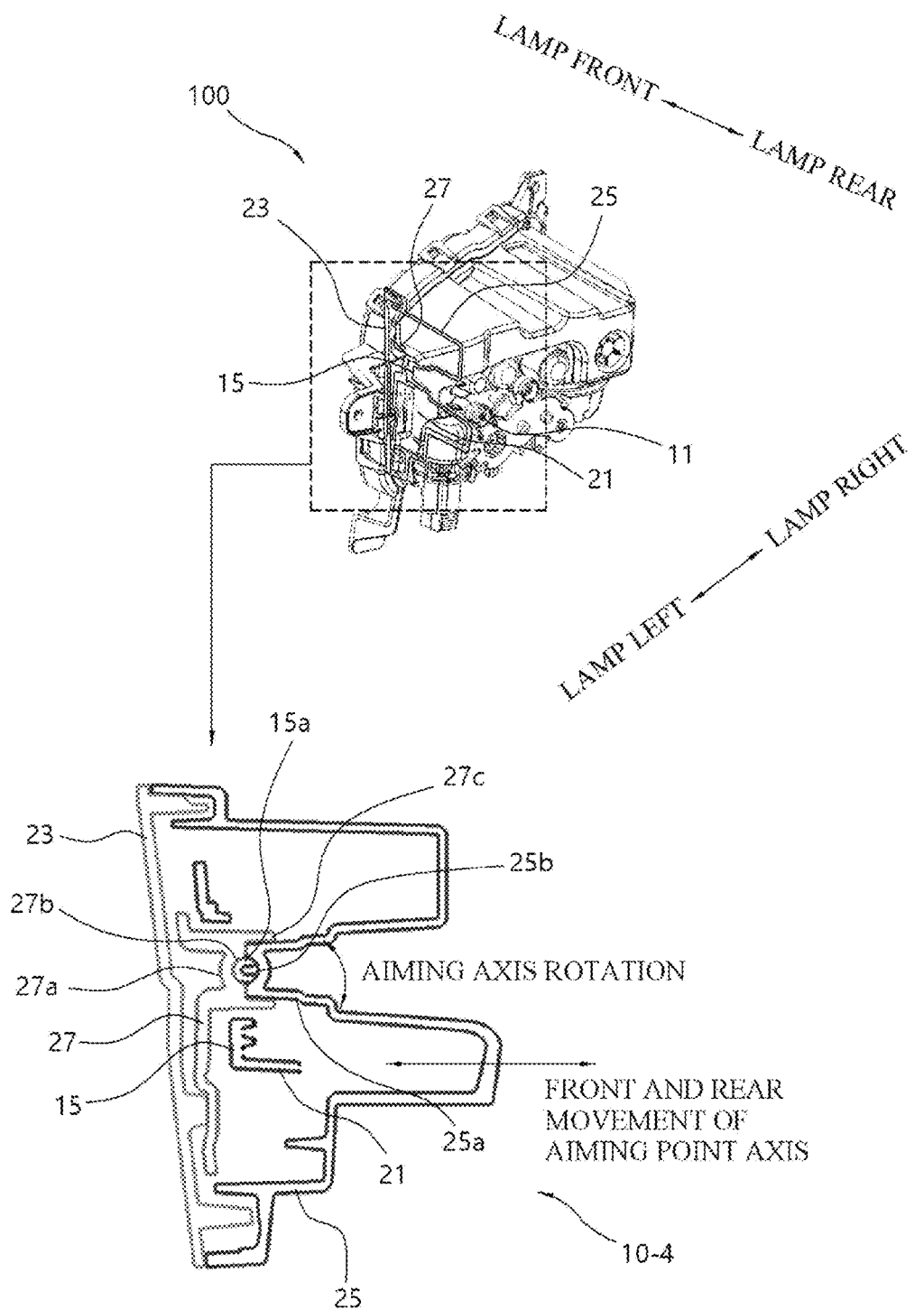

Referring to FIGS. 5 and 6, the forward movement type aiming device 10-4 has the same components as the aiming point axis 11, the aiming axis 15, the reflector bracket 17, the reflector 21, the lens 23, the lamp housing 25, the bezel 27, and the light source 29 described in the bezel type aiming device 10-2 illustrated in FIG. 2.

However, there is a difference in that in the forward movement type aiming device 10-4, the edge of the bezel support part 27a extends to be formed as a housing connection part 27c unlike the bezel 27 illustrated in FIG. 2 forming the bezel support part 27a and the hemispheric section groove 27b. In this case, the housing connection part 27c surrounds and holds the facing housing support part 25a of the lamp housing 25 surrounding the pivot end 15a of the aiming axis 15 by the hemispheric section grooves 25b, 27b with the aiming movement gap (t). In this case, the bezel 27 may be formed with the housing connection part 27c on the lens support part 23a of the lens 23.

Therefore, if the forward movement type aiming device 10-4 is applied to the fog lamp 100, the forward movement type aiming device 10-4 may move and position the aiming axis 15 forward from the lens 23 side to be close to a lens skin while positioning the aiming axis 15 on one side surface of the fog lamp 100 (e.g., left portion of the lamp).

Therefore, in the forward movement type aiming device 10-4, the aiming axis 15 positioned in the front portion of the internal space of the fog lamp 100 is closer to a lens skin surface of the lens 23 in a state where the distance (i.e., the moment distance of the reflector 21) of the aiming adjustment height (H) with respect to the aiming point reference line (K-K) of the aiming point axis 11 is the same, and the lens proximity structure of the aiming axis 15 may make an amount of movement of the reflector for aiming the same angle smaller in addition to deleting the conventional retainer and pivot, thereby setting the distortion of the reflector to be small after the aiming work.

Further, the forward movement type aiming device 10-4 may reduce the internal space of the lamp by a forward movement distance of the aiming axis 15 in the internal space of the fog lamp 100, and the reduction in the space occupied by the internal space of the lamp of the aiming axis 15 may form a rear shock absorption space in a rear space of the fog lamp 100, thereby securing the structural robustness of the lamp meeting the low-speed collision regulation.

Figure 7:
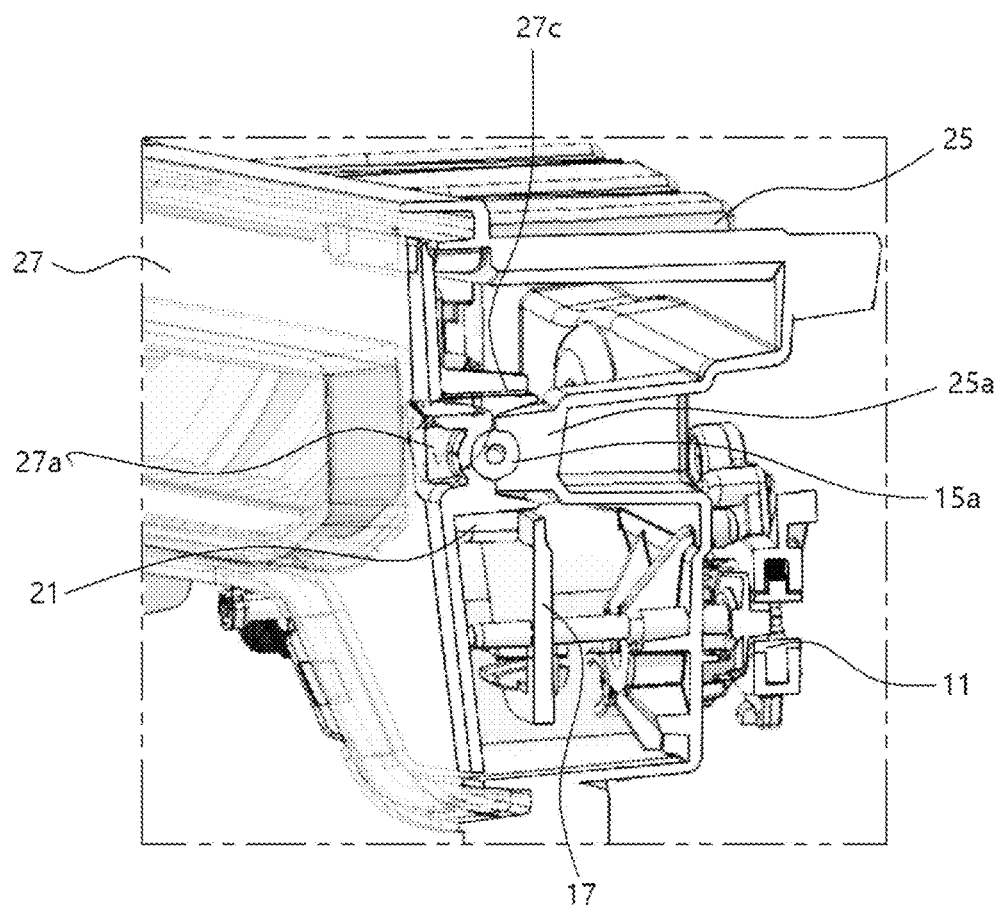
FIG. 7 is a diagram illustrating a configuration of the rotation center decoupling type aiming lamp according to the present disclosure applying a virtual focus type aiming device.

Referring to FIG. 7, the virtual focus type aiming device 10-3 has the same components as the aiming point axis 11, the aiming axis 15, the reflector bracket 17, the reflector 21, the lamp housing 25, the bezel 27, and the light source 29 illustrated in FIGS. 1 to 3.

However, there is a difference in that in the virtual focus type aiming device 10-3, the aiming axis 15 is formed with a curved end 15b instead of the pivot end 15a unlike in the lens type aiming device 10-1 illustrated in FIG. 1 or the bezel type aiming device 10-2 illustrated in FIG. 2.

For example, the curved end 15b is vertically erected on one side edge of the rotation interval body of the aiming axis 15, and forms a curve in an arc shape at a predetermined radius (R).

In this case, the predetermined radius (R) may be a distance between the curved end 15b and a virtual focus (0). Further, the virtual focus (0) is operated as a virtual aiming center axis, and thus is set outside the lamp or may be set inside the lamp, as necessary.

For example, for the curved end 15b, each of the lens support part 23a of the lens 23, the housing support part 25a of the lamp housing 25, and the bezel support part 27a of the bezel 27 is formed of curved surfaces 23b', 25b', and 27b' instead of the hemispheric section grooves 23b, 25b, 27b.

Particularly, the curved surfaces 23b', 25b', 27b' closely contact the front and rear of the curved end 15b to hold the aiming axis 15, such that the aiming adjustment for the reflector 21 is performed by the vertical movement of the curved end 15b using the virtual focus (0) of the aiming axis 15.

Figure 8:
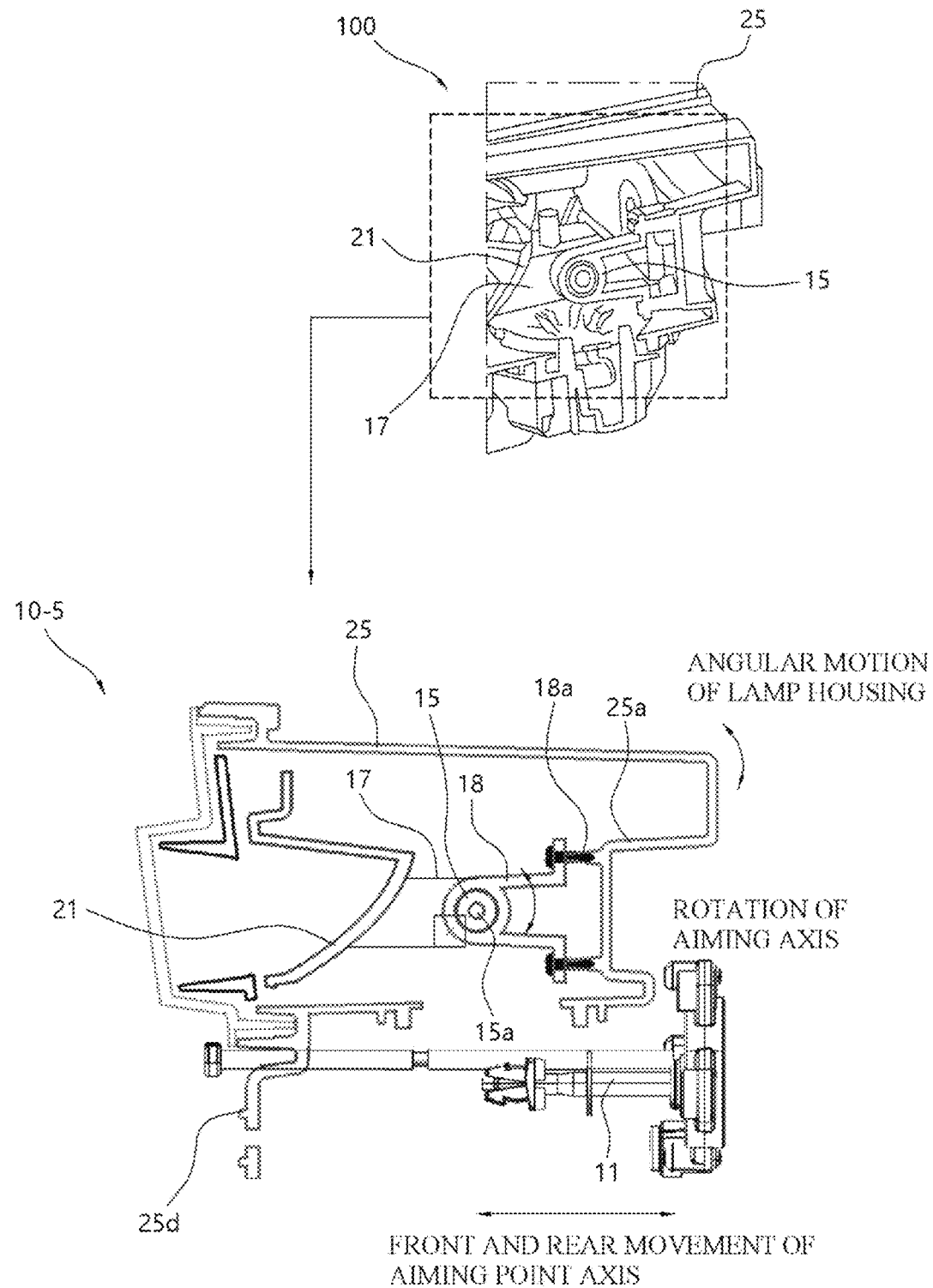
FIG. 8 is a diagram illustrating a configuration of the rotation center decoupling type aiming lamp according to the present disclosure applying a housing type aiming device.

Referring to FIG. 8, the housing type aiming device 10-5 has the same components as the aiming point axis 11, the aiming axis 15, the reflector bracket 17, the reflector 21, the lens 23, the lamp housing 25, the bezel 27, and the light source 29 described in the lens type or bezel type aiming device 10-1 or 10-2 illustrated in FIGS. 1 and 2.

However, the housing type aiming device 10-5 uses an aiming axis bracket 18 as a separate injection structure. This is caused by a structure necessary for using a separate small, unusual thing other than the bezel or the lens for reason of molding in the structure for holding the reflector in the housing. Therefore, the reflector 21, the lens 23, the lamp housing 25, and the bezel 27 are not formed with the hemispheric section grooves 23b, 25b, 27b.

For example, the aiming axis bracket 18 is a separate injection structure and thus further includes a screw 18a for fixing it to the reflector bracket 17 coupled to the reflector 21 and the aiming axis 15 to the housing support part 25a of the lamp housing 25 while forming an axial hole for fixing the reflector bracket 17 coupled to the reflector 21 and the aiming axis 15, such that there is a component difference from the lens type or bezel type aiming device 10-1 or 10-2 illustrated in FIGS. 1 and 2. In this case, the axial hole of the aiming axis bracket 18 is formed in a structure of surrounding the pivot end 15a of the aiming axis 15, and protrudes toward the reflector 21.

Therefore, in the housing type aiming device 10-5, the aiming point axis 11 is coupled to a housing front part 25d of the lamp housing 25 by a screw to perform the front and rear directional movement, one side portion of the aiming axis bracket 18, which is the separate injection structure, is fastened to the housing support part 25a of the lamp housing 25 by the screw by the fastening of the screw 18a, and the reflector bracket 17 is connected to the reflector 21 in a state of being fixed to the aiming axis 15 by the axial hole of the aiming point axis 11.

Therefore, in the housing type aiming device 10-5, the front and rear directional movement of the aiming point axis 11 upon adjusting the aiming rotates the aiming axis 15 together with the lamp housing 25, and the movement of the reflector 21 is formed by receiving the rotation of the aiming axis 15 by the reflector bracket 17, thereby changing the angle for adjusting the aiming.

Therefore, the housing type aiming device 10-5 is assembled in the lamp housing 25 by the aiming axis 15, which is a separate injection structure, thereby implementing a structure capable of freely vertically moving the axis, performing the work at the same angle regardless of the distance of the aiming adjustment height (H) with respect to the aiming point reference line (K-K) of the aiming point axis 11, and being prevented from being easily separated even while moving to the aiming axis 15 more accurately.

Meanwhile, FIG. 9 illustrates that the aiming device 10 is constituted as the semi type aiming device 10-6.

As shown in FIG. 9, the head lamp 200 is provided with a high beam aiming device 210A implementing the aiming operation for a high beam, a low beam aiming device 210B, and the semi type aiming device 10-6, in which the semi type aiming device 10-6 is connected to the high beam aiming device 210A using a semi aiming axis 210-1. This is because the high beam aiming device 210A adjusts the aiming in the same vertical aiming structure as that of the fog lamp 100 illustrated in FIG. 4.

Therefore, the semi type aiming device 10-6 may substitute the aiming point axis 11 illustrated in FIGS. 1 to 8 with the semi aiming axis 210-1, thereby deleting the aiming point axis 11, substitute the pivot rotation structure illustrated in FIG. 3 with a pivot bracket 19 having a pivot hole 19a into which the pivot end 15a of the aiming axis 15 is fitted, in which the pivot bracket 19 forms the aiming point reference line (K-K) required by the aiming axis 15 on a portion of a holder 230 using a portion of a heat sink 220 or a portion of the reflector 21.

Particularly, the pivot rotation structure by a combination of the aiming axis 15 and the pivot bracket 19 may be substituted with a retainer 240 with a simple structure in which the pivot structure is removed from the conventional pivot retainer.

As described above, the rotation center decoupling type aiming lamp 1-1 applied to the vehicle 1 according to the present exemplary embodiment includes the aiming device 10 in which the aiming axis 15 spaced apart from the aiming point reference line (K-K) of the aiming point axis 11 at the distance (i.e., the moment distance of the reflector 21) of the aiming adjustment height (H) is operated as the rotation center of the reflector 21, and the aiming angle is changed through the aiming point axis 11 to which the reflector 21 is attached by the reflector bracket 17.

Therefore, in the rotation center decoupling type aiming lamp 1-1, the rotation center of the reflector adjusting the light radiation direction may be formed at the position above or ahead of the aiming point reference line (K-K), thereby reducing the occupation space of the aiming device in the internal space of the lamp and stably performing the aiming driving without occurrence of the gap by the minute movement of the reflector according to the increase in the vertical inter axis distance, and particularly, the rear shock absorption space may be formed in the lamp by an amount of reduction in the size of the aiming device, thereby securing the structural robustness of the lamp meeting the low-speed collision regulation.

What is claimed is:

1. An aiming lamp, comprising:
   an aiming point axis forming an aiming point reference line in an internal space of the aiming lamp, and configured to be moved in front and rear directions for adjusting aiming of a light source;
   an aiming axis positioned in an upper portion of the internal space of the aiming lamp, and forming an aiming adjustment height with respect to the aiming point reference line; and
   a reflector bracket connected to a reflector for reflecting light of the light source, for delivering movement of the aiming point axis, and constituted such that an aiming angle of the light source is changed by an angular motion of the reflector using the aiming axis as a rotation center;
   wherein the aiming axis is connected to the reflector by a rotation interval body forming a pivot end,
   wherein the rotation interval body is formed with at least one bending portion, and
   wherein the bending portion adjust a change in angular motion of the reflector by adjusting a distance of the aiming adjustment height.

2. The aiming lamp of claim 1,
   wherein the aiming axis forms the rotation center of the reflector with the pivot end having a circular section.

3. The aiming lamp of claim 2,
   wherein the pivot end is formed with a pivot rotation part, and
   wherein the pivot rotation part is formed by combining one or more of a lens positioned ahead of the reflector, a lamp housing forming an internal space in which the reflector is accommodated, or a bezel positioned between lenses of the aiming lamp.

4. The aiming lamp of claim 3,
   wherein two or more of the lens, the lamp housing, or the bezel are formed with hemispheric section grooves surrounding a circular section portion of the pivot end on both sides thereof.

5. The aiming lamp of claim 4,
   wherein the hemispheric section groove forms an aiming movement gap with respect to the circular section portion of the pivot end.

6. The aiming lamp of claim 5,
   wherein the aiming movement gap provides movement to the aiming axis to secure a space in which the reflector is aimed.

7. The aiming lamp of claim 1,
   wherein the aiming axis forms the rotation center of the reflector with a curved end.

8. The aiming lamp of claim 7,
   wherein the curved end forms a virtual focus for the reflector.

9. The aiming lamp of claim 7,
   wherein the curved end is constituted by combining one or more of a lens positioned ahead of the reflector, a lamp housing forming an internal space in which the reflector is accommodated, or a bezel positioned between lenses of the aiming lamp.

10. The aiming lamp of claim 8,
    wherein two or more of the lens, the lamp housing, or the bezel are formed with curved surfaces instead of closely contacting the curved end on both sides thereof.

11. The aiming lamp of claim 1,
    wherein the aiming axis is coupled to an aiming axis bracket, and
    wherein the aiming axis bracket is fixed to a lamp housing forming an internal space in which the reflector is accommodated.

12. The aiming lamp of claim 11,
    wherein the aiming axis bracket protrudes toward the reflector to surround a pivot end of the aiming axis.

13. The aiming lamp of claim 11,
    wherein the aiming axis bracket is fastened to the aiming lamp housing by a screw.

14. A vehicle, comprising the aiming lamp of claim 1,
    wherein the rotation center of the aiming axis forms a moment distance of the reflector, and the aiming angle of the light source is changed by the angular motion of the reflector at the moment distance.

15. The vehicle of claim 14,
    wherein the aiming lamp changes the aiming angle by an aiming device, and
    wherein the aiming device forms a pivot rotation part by surrounding the pivot end of the aiming axis by a combination of one or more of a lens positioned ahead of the reflector, a lamp housing forming an internal space of the aiming lamp in which the reflector is accommodated, or a bezel positioned between lenses of the aiming lamp.

16. The vehicle of claim 15,
    wherein the aiming lamp is a fog lamp, and
    wherein the fog lamp is applied with a lens aiming device forming the pivot rotation part by the lens and the lamp housing or a bezel aiming device forming the pivot rotation part by the bezel and the lamp housing.

17. The vehicle of claim 15,
    wherein the aiming lamp is a fog lamp, and
    wherein the fog lamp is applied with a forward movement aiming device in which the pivot rotation part is formed by the lens and the lamp housing or the bezel and the lamp housing, and each of the lens and the bezel is formed with a housing connection part coupled to the lamp housing.

18. The vehicle of claim 15,
    wherein the aiming lamp is a fog lamp, and
    wherein the fog lamp is applied with a virtual focus aiming device in which the pivot rotation part is formed by the lens and the lamp housing or the bezel and the lamp housing, and a virtual focus for the reflector is formed.

19. The vehicle of claim 15,
    wherein the aiming lamp is a fog lamp, and
    wherein the fog lamp is applied with a housing aiming device in which the pivot rotation part is formed by an aiming axis bracket coupled to the aiming axis and fixed to the lamp housing.

20. The vehicle of claim 15,
wherein the aiming lamp is a headlamp, and
wherein the headlamp is applied with a semi aiming device in which a semi aiming axis connected to a high beam aiming device is provided, and the semi aiming axis is connected to the aiming axis by a pivot bracket.

\* \* \* \* \*